Oct. 16, 1928.
A. NOVICK
1,687,506
LIQUID LEVEL GAUGE
Filed Feb. 8, 1926
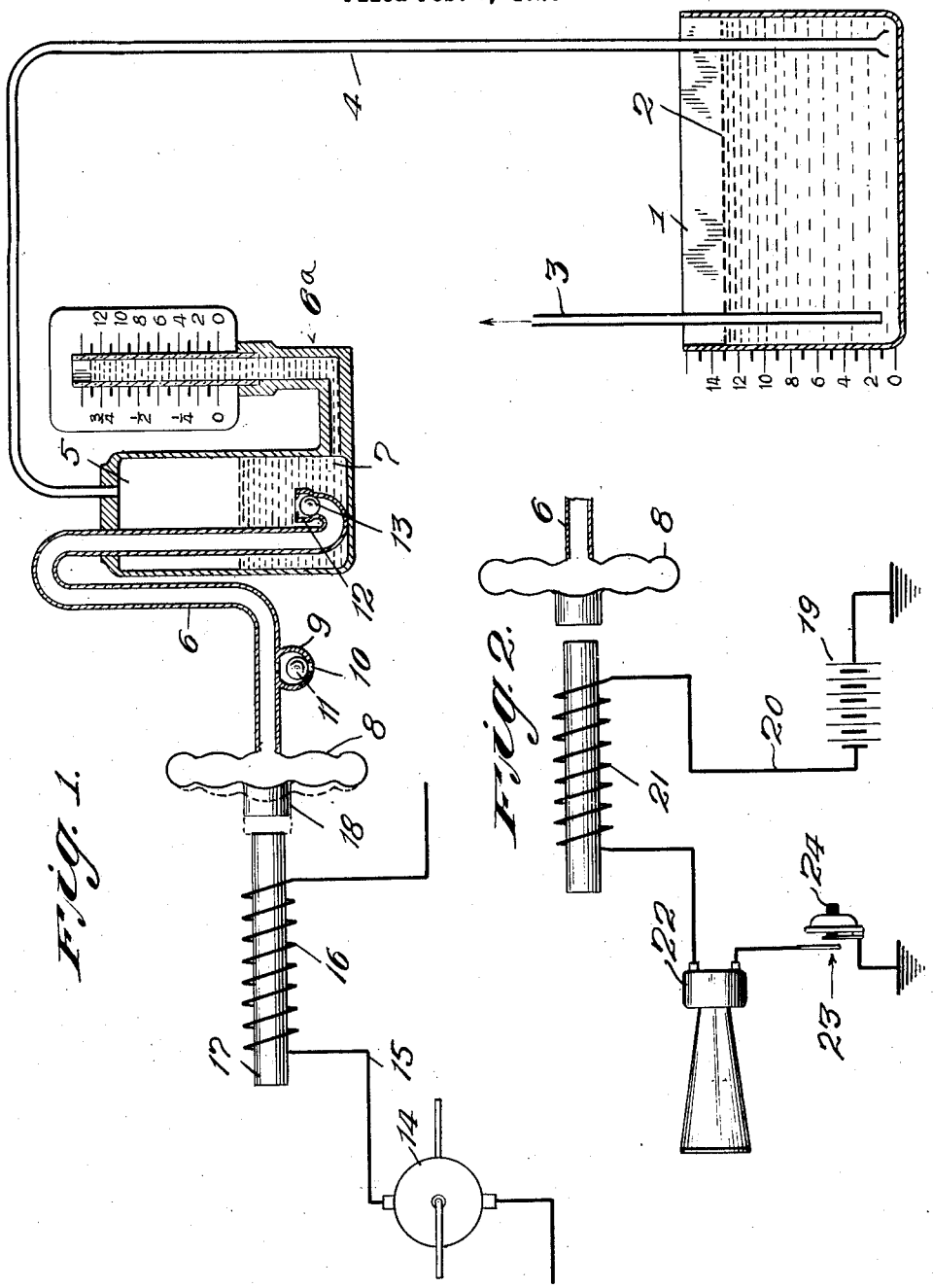
INVENTOR
Abraham Novick
BY
Moses & Nolte
ATTORNEY Patented Oct. 16, 1928.

1,687,506

UNITED STATES PATENT OFFICE.

ABRAHAM NOVICK, OF FLUSHING, NEW YORK, ASSIGNOR TO F. L. SMITHE MACHINE CO., INC., OF NEW YORK, N. Y., A CORPORATION OF NEW YORK.

LIQUID-LEVEL GAUGE.

Application filed February 8, 1926. Serial No. 86,756.

This invention relates to liquid level gauges of the type in which a submerged conduit is used, the pressure of air in which varies according to the level of the liquid to be gauged.

In each of my pending applications, Serial Nos. 13,165, filed March 5, 1925, for liquid level gauges, and 23,796, filed April 17, 1925, for liquid level gauges, provision is made of a gauge of this type in combination with means for automatically introducing air into the conduit for the purpose of maintaining the conduit free from liquid and thereby insuring accurate calibration of the gauge at all times. In such prior applications the air introducing means comprises an air pumping apparatus including a deformable chamber, means for automatically deforming the chamber to produce suction and pressure therein alternately, and a feeder between the chamber and the conduit constructed to cause air to be injected into the conduit when pressure occurs in the chamber.

It is an object of the present invention to provide improved means for operating the deformable chamber of a gauge of this character, which will be cheap to manufacture, and will be simple, durable and efficient in use. The invention is not confined, however, to use with the particular form of pumping apparatus referred to.

More specifically, the present invention has for an object to utilize an electric circuit, preferably one which varies in the operation of the machine, for actuating an electrical device to operate the air pumping apparatus.

Other objects and advantages will hereinafter appear.

In the drawings,

Figure 1 is a diagrammatic side elevation, partly in section, showing a liquid level gauge arranged to be recalibrated by the novel mechanism of the present invention.

Figure 2 is a side elevation, partly in section, showing another embodiment of the novel operating means.

The invention is shown as embodied in a gasoline level indicating apparatus for an automobile. The gasoline tank 1 contains gasoline 2 which is fed through a pipe 3 and other suitable connections, not shown, to the motor. A conduit 4, submerged in the gasoline, terminates adjacent the bottom of the tank and communicates at its upper end with a chamber 5 forming part of a manometer gauge 6ª. The conduit 4 and chamber 5 have a considerable quantity of air trapped therein, which is subject to the head of gasoline on the opening at the bottom of the conduit 4. This air transmits the pressure of the gasoline to the indicator liquid 7 in the manometer gauge 6ª.

Due to variations of temperature, absorption of air by the gasoline, and other causes, the gauge would quickly lose its calibration if some provision were not made for introducing air to the conduit and the chamber 5 for recalibrating the gauge from time to time.

To this end provision is made of a closed diaphragm box 8 which communicates through a tube 6 of small diameter with the chamber 5. The diaphragm box may be alternately expanded and contracted and will be effective by such expansion and contraction to produce suction and compression alternately in the tube 6. In conjunction with the diaphragm box, provision is made of means for causing the compression produced in the tube 6 to force air into the chamber 5 and conduit 4. For this purpose the tube 6 is provided with an intake valve comprising a socket 9 having a port 10 therein, and a ball 11 which is effective to close said port when pressure is created in the tube. The delivery end of the tube 6 extends downward into the liquid 7 in chamber 5, and terminates in a short U-bend provided with an enlargement 12 at its lower end forming a seat for a ball 13 which serves as a non-return valve for preventing the liquid 7 from being drawn into the tube 6 when suction occurs in said tube.

In the form of the invention disclosed in Figure 1, provision is made of electrical means operating from the generator 14 to alternately expand and contract the diaphragm box 8. As shown herein, a conductor 15 extends from the generator and is wrapped into a coil 16 around a core 17 to form an electromagnet which is mounted in proximity to a stud 18 of magnetic material projecting from one side of the diaphragm box. It is well known that the current generated in the operation of an automobile fluctuates considerably. Such fluctuations may be termed casual variations since they occur incidentally in the operation of the vehicle, and are not caused by any mechanisms designed to produce or control them. The diaphragm box may be so designed that it will pull loose from the electromagnet and spring to the full line position indicated in Figure 1 when the generator current falls below a given value, but will be attracted by and held the electromagnet when the current exceeds such value.

With this arrangement, the diaphragm box will be caused to expand and contract automatically at intervals in the operation of the machine, and will be effective, therefore, to introduce air from time to time into the conduit 4 for recalibrating the instrument. It will be understood, of course, that any excess of air over that required to expel all the gasoline from the lower end of the conduit 4 will simply bubble out through the gasoline in the tank and will not, therefore, cause the gauge to register an amount in excess of the contents of the tank.

In the form of the invention disclosed in Figure 2, the diaphragm box 8 is also expanded and contracted by electrical means, the means employed in this instance being provided in the circuit of the horn motor. In this form of the invention the battery 19 is grounded at one of its terminals and has its other terminal connected to a conductor 20, which conductor is connected with an electromagnet 21 in series with the horn motor 22, and with a contact-making switch 23 for blowing the horn. The contact-making switch has one of its terminals grounded and thereby completes the circuit to the grounded battery terminal whenever the switch is closed.

With this construction the diaphragm box remains normally in the position shown in Figure 2. Whenever the horn is sounded, however, current is caused to flow through the electromagnet 21, energizing it and causing the diaphragm box to be expanded, thus creating suction in the tube 6 and drawing in air through the intake valve. As soon as the button 24 of the horn-blowing switch is released, the electromagnet is de-energized and the diaphragm box returns to normal position, thereby reducing its volume and creating a pressure in the tube 6 which causes air to be forced through the liquid 7 into the chamber 5 and the conduit 4 to recalibrate the gauge in the manner already described.

The current variations utilized to operate the pump in this form of the invention are also casual variations in the sense in which that term is used herein.

It will be apparent that other means could be utilized for energizing the electromagnet than those described.

It will be appreciated further that the electrical operating means is not confined to operating a compressor of the particular form and type shown, but that any equivalent apparatus might be substituted for the diaphragm box.

Variations may be resorted to within the scope of the appended claims, and parts of the improvements may be used without others.

What I claim is:

1. In a motor vehicle including an electric circuit and means producing casual variations of current flow therein, a device for indicating the depth of liquid in a tank, including a conduit extending into the tank and having an opening communicating with the liquid therein so as to be subject to the head of liquid on said opening and a gauge connected to be responsive to the pressure in the conduit, air pumping means for introducing air into the conduit to recalibrate the gauge, and means actuated by the casual variations of current flow in the electric circuit to operate said air pumping means.

2. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, air pumping means for introducing air into the conduit to recalibrate the gauge, means supplying a casually variable current when the vehicle is in operation, and electrical means responding to variations in said current to operate said pumping means automatically.

3. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, and means for injecting air into the conduit to recalibrate the gauge, comprising a chamber in communication with the conduit, said chamber having a movable wall, magnetic means on said wall, an electromagnet adjacent said magnetic means, and means for supplying energizing current to said electromagnet.

4. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, and means for injecting air into the conduit to recalibrate the gauge, comprising a box having a resilient, deformable wall, magnetic means on said wall, an electromagnet cooperating therewith, and means supplying a fluctuating current for variably energizing said electromagnet.

5. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, and means for introducing air into the conduit to recalibrate the gauge, comprising air pumping means, a source of casually variable electrical current, and electromagnetic means actuated by the casual variations of the current to operate the pumping means.

6. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, and means for introducing air into the conduit comprising air pumping means, a generator acting in the operation of the machine to produce casually variable current, and an electromagnet connected to be responsive to said current for operating the air pumping means.

7. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, and means for automatically introducing air into the conduit comprising air pumping means, an electromagnet for operating the pumping means, and means acting casually in the operation of the vehicle to cause the electromagnet to operate the pumping means intermittently.

8. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, and means for automatically introducing air into the conduit comprising air pumping means, an electric generator producing a casually variable current, and means connected for operation by the casual variations of current to actuate the air pumping means.

9. In a motor vehicle, a device for indicating the depth of liquid in a tank, comprising a conduit extending into the tank and having an opening communicating with the liquid therein so as to be subject to the head of liquid on said opening, and a gauge connected to be responsive to the pressure in the conduit, and means for automatically introducing air into the conduit, comprising a resilient diaphragm box, a generator operated at different speeds according to the speed of the vehicle motor, an electromagnet energized by the generator current and effective to hold the diaphragm box expanded when the generator current exceeds a certain value, and to release the diaphragm box and permit it to collapse when the generator current falls below such value.

10. In a motor vehicle, a device for indicating the depth of liquid in a tank, comprising a conduit extending into the tank, and having an opening communicating with the liquid therein so as to be subject to the head of liquid on said opening, and a gauge connected to be responsive to the pressure in the conduit, and means for automatically introducing air into the conduit, comprising a resilient diaphragm box, an electromagnet arranged to hold the diaphragm box expanded when the magnetizing current exceeds a certain critical value, and to release the diaphragm box and permit it to collapse when the magnetizing current falls below such critical value, and means for causing a current to be supplied to the electromagnet which fluctuates above and below said critical value.

In testimony whereof I have affixed my signature to this specification.

ABRAHAM NOVICK.